(12) United States Patent
Beyerlein et al.

(10) Patent No.: US 11,473,666 B2
(45) Date of Patent: Oct. 18, 2022

(54) GEAR ASSEMBLY WITH WEAR DETECTION

(71) Applicant: Steering Solutions IP Holding Corporation, Saginaw, MI (US)

(72) Inventors: Jeffrey E. Beyerlein, Frankenmuth, MI (US); Jason T. Rutkiewicz, Freeland, MI (US); Niklaus A. von Matt, Midland, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 20 days.

(21) Appl. No.: 17/060,590

(22) Filed: Oct. 1, 2020

(65) Prior Publication Data

US 2021/0018083 A1    Jan. 21, 2021

Related U.S. Application Data

(62) Division of application No. 15/820,819, filed on Nov. 22, 2017, now Pat. No. 10,801,603.

(60) Provisional application No. 62/425,856, filed on Nov. 23, 2016.

(51) Int. Cl.
| | |
|---|---|
| *F16H 57/01* | (2012.01) |
| *F16H 1/16* | (2006.01) |
| *F16H 55/22* | (2006.01) |
| *B62D 5/04* | (2006.01) |
| *F16H 55/06* | (2006.01) |

(52) U.S. Cl.
CPC ........... *F16H 57/01* (2013.01); *B62D 5/0409* (2013.01); *B62D 5/0481* (2013.01); *F16H 1/16* (2013.01); *F16H 55/06* (2013.01); *F16H 55/22* (2013.01); *F16H 2057/012* (2013.01)

(58) Field of Classification Search
CPC ............... F16H 57/01; F16H 2057/012; F16H 2057/018; F16H 1/16; F16H 55/06; F16H 55/22; F16H 2055/065; F27D 21/0021
USPC ........................................ 74/DIG. 7, DIG. 10
See application file for complete search history.

(56) References Cited

U.S. PATENT DOCUMENTS

| | | | | |
|---|---|---|---|---|
| 3,730,009 | A * | 5/1973 | Mead | F16H 55/06 474/161 |
| 4,055,092 | A * | 10/1977 | Aberg | F16H 55/18 74/439 |
| 4,184,380 | A * | 1/1980 | Rivin | F16H 55/06 74/461 |
| 8,011,266 | B2 * | 9/2011 | Brackney | F16H 55/18 74/440 |
| 10,801,603 | B2 * | 10/2020 | Beyerlein | B62D 5/0409 |

(Continued)

*Primary Examiner* — Anne Marie M Boehler
(74) *Attorney, Agent, or Firm* — Dickinson Wright PLLC

(57) ABSTRACT

A gear assembly includes a first gear and a second gear. The first gear rotates about a first axis, and includes a first plurality of teeth and a first surface extending circumferentially and carried by the first plurality of teeth. The first surface is electrically conductive. The second gear rotates about a second axis and is operably connected to the first gear. The second gear includes an electrically conductive element, a second plurality of teeth, and a second surface extending circumferentially and carried by the second plurality of teeth. The second surface is electrically nonconductive. The electrically conductive element includes a plurality of feelers with each feeler projecting radially outward and into a respective tooth of the second plurality of teeth.

9 Claims, 7 Drawing Sheets

(56) References Cited

U.S. PATENT DOCUMENTS

| | | | | |
|---|---|---|---|---|
| 2009/0009158 A1* | 1/2009 | Singh | ............... | F16C 29/0633 |
| | | | | 324/207.15 |
| 2017/0175870 A1* | 6/2017 | Park | ............... | F16H 55/06 |
| 2017/0284914 A1* | 10/2017 | Johnson | ............... | G01M 13/022 |
| 2019/0376593 A1* | 12/2019 | Hsu | ............... | F16H 55/17 |

* cited by examiner

GEAR ASSEMBLY WITH WEAR DETECTION

CROSS-REFERENCES TO RELATED APPLICATIONS

This patent application claims is a divisional application of U.S. patent application Ser. No. 15/820,819, filed Nov. 22, 2017, which claims priority to U.S. Provisional Patent Application Ser. No. 62/425,856, filed Nov. 23, 2016, both of which are incorporated herein by reference in their entirety.

BACKGROUND OF THE INVENTION

The present disclosure relates to gear assemblies, and more particularly to gear assemblies with wear detection.

Gear assemblies may include at least two gears each having a plurality of teeth that mesh with one-another. Rotation of a first gear about a first centerline may drive the rotation of a second gear about a second centerline. In some assemblies, the first gear may be a worm shaft directly connected, and having a common rotational axis, to an electric motor. The motor provides the necessary torque that drives the second gear. One application of a gear assembly utilizing an electric motor may be a power steering system for a vehicle. With continued use of such gear assemblies, the teeth of one or both gears may wear and/or may require maintenance.

Accordingly, it is desirable to provide a means of teeth wear detection.

SUMMARY OF THE INVENTION

In one exemplary embodiment of the present disclosure, a gear assembly includes a first gear and a second gear. The first gear rotates about a first axis, and includes a first plurality of teeth and a first surface extending circumferentially and carried by the first plurality of teeth. The first surface is electrically conductive. The second gear rotates about a second axis and is operably connected to the first gear. The second gear includes an electrically conductive element, a second plurality of teeth, and a second surface extending circumferentially and carried by the second plurality of teeth. The second surface is electrically nonconductive. The electrically conductive element includes a plurality of feelers with each feeler projecting radially outward and into a respective tooth of the second plurality of teeth.

In another exemplary embodiment, a vehicle power steering assembly includes an electric motor, a worm shaft, a gear, and an electrically conductive element. The electric motor is constructed and arranged to output a steering torque. The worm shaft is rotationally driven by the electric motor about a first axis. The worm shaft is made of an electrically conductive material and includes a first plurality of teeth. The gear is rotationally driven by the worm shaft about a second axis, and includes a second plurality of teeth operably engaged to the first plurality of teeth. The second plurality of teeth includes a circumferentially continuous surface, and the gear is made of an electrically non-conductive material. The electrically conductive element is engaged to the gear and includes a plurality of feelers. Each feeler is circumferentially aligned to a respective one of the second plurality of teeth, projects radially outward, and is at least in-part spaced radially inward from the surface.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
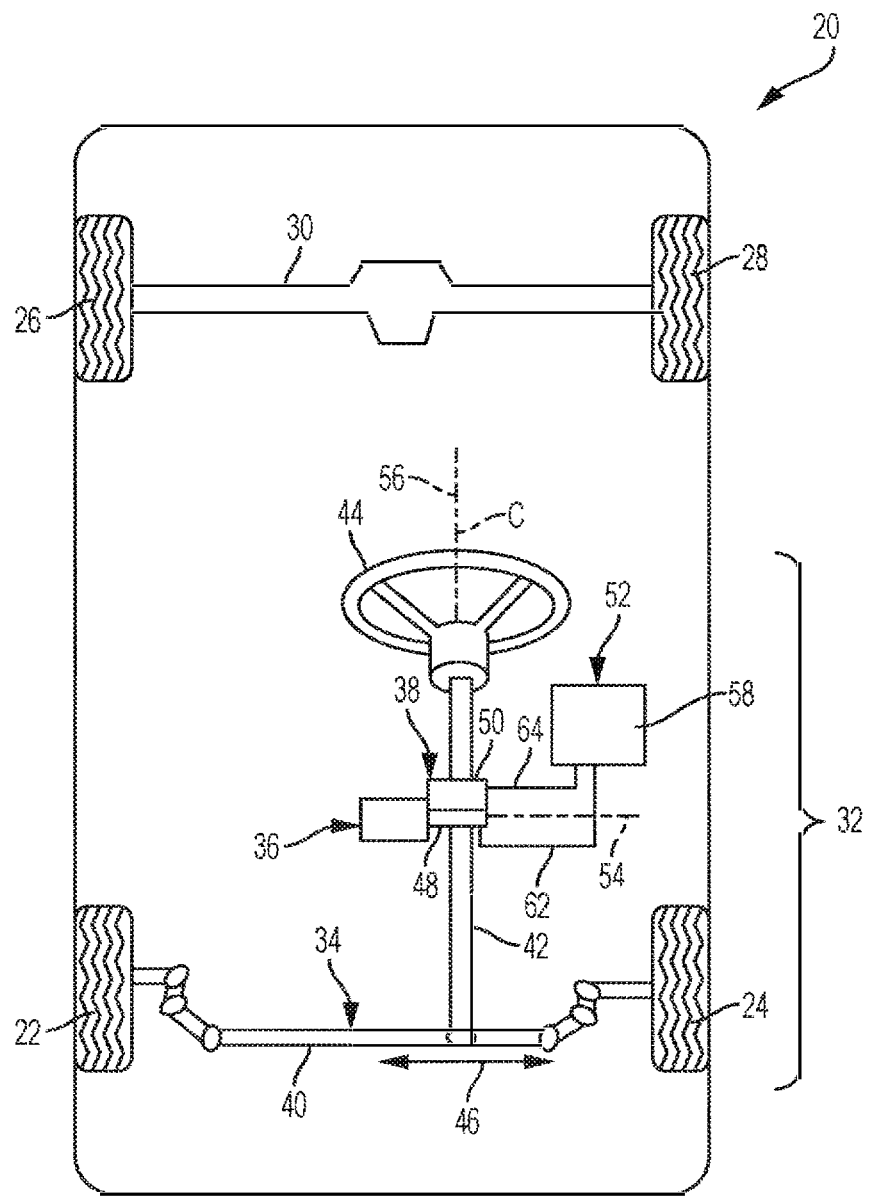
FIG. 1 is a schematic of a vehicle power steering assembly incorporating a gear assembly as one, non-limiting, exemplary embodiment of the present disclosure.

Referring now to the Figures, where the invention will be described with reference to specific embodiments, without limiting same, a vehicle 20 is illustrated in FIG. 1. The vehicle 20 may include two front wheels 22, 24, two rear wheels 26, 28, a rear axle 30 (e.g., differential), and a power steering system 32 that may be electric. The power steering system 32 may include a mechanical steering linkage 34, an electric motor 36, and a gear assembly 38 capable of wear detection. The rear wheels 26, 28 may be engaged for rotation to respective, opposite, ends of the rear axle 30.

The mechanical steering linkage 34 may include a rack 40, a steering column 42, and a steering wheel 44 connected to a distal end of the steering column 42. The front wheels 22, 24 are generally engaged for rotation to respective, opposite, ends of the rack 40. The steering column 42 is operably engaged to the rack 40, and rotates about a centerline C when the steering wheel 44 is rotated by a user (e.g., human driver). Rotation of the steering column 42 generally causes linear motion (see arrow 46) of the rack 40. The linear motion 46 of the rack 40 may cause the rack to generally push and pull upon the wheels 22, 24, thereby turning or directing the wheels in an angular direction desired by the user.

Figure 2:
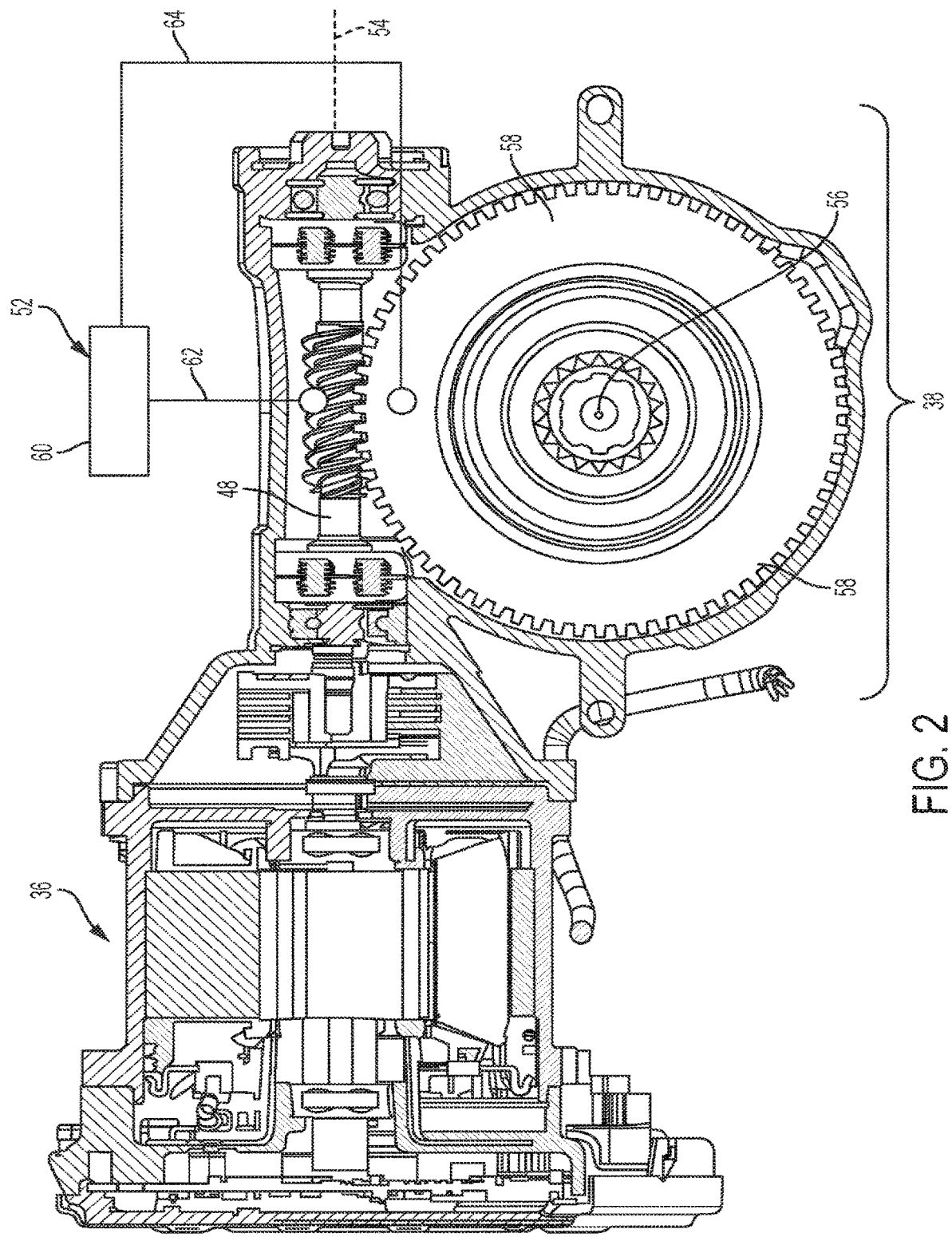
FIG. 2 is a cross section of the gear assembly driven by an electric motor.

Referring to FIGS. 1 and 2, the electric motor 36 and the gear assembly 38 in the present, non-limiting, disclosure are utilized to assist the user in the effort of steering the vehicle 20 by applying an additional torque or rotational force to the steering column 42 of the mechanical steering linkage 34. The gear assembly 38 may include a first gear 48, a second gear 50 (see FIG. 3), and an electrical circuit 52. The first gear 48 may be directly driven by the motor 36, and may be a worm shaft that rotates about an axis 54 disposed normal to the centerline C and co-extends with a rotational axis of the electric motor 36. The second gear 50 may be driven by the worm shaft 48, and may rotate about an axis 56 that may co-extend with the centerline C of the steering column 42. The worm shaft 48 may be located between, and is operably coupled to, the electric motor 36 and the second gear 50. The second gear 50 may be located between, and is operably coupled to, the worm shaft 48 and the steering column 42. The first axis 54 may be disposed normal to the second axis 56.

In another embodiment, one of the gears 48, 50 may be a rack gear (i.e., rack and pinion gear assembly) that converts rotational motion into linear motion to assist a user when steering the vehicle 20. It is contemplated and understood that the electric motor 36 and the gear assembly 38 may, alternatively, be mounted on the rack 40 to assist in the push and pull effort placed upon the rack 40 to direct the wheels 22, 24. It is further contemplated, that the power steering system 32 may be a steer-by-wire system Referring to FIGS. 2-4, the electrical circuit 52 is generally an open circuit configured to close upon sufficient wear between the gears 48, 50. The electrical circuit 52 may include an electrically conductive element 58, an indicator 60, an electrically conductive first leg 62, and an electrically conductive second leg 64 (also see FIG. 1). The worm shaft 48 may generally be part of the electrical circuit 52, and may be made of an electrically conductive material such as, for example, steel, brass, and other conductive materials. The first leg 62 may generally provide an electrically conductive pathway between the worm shaft 48 and the indicator 60. The element 58 may generally be secured to, and rotates with, the gear 50, and the second leg 64 may generally provide an electrically conductive pathway between the element 58 and the indicator 60.

When the gear 50 is worn, an electrical contact is made between the worm shaft 48 and the element 58, thus closing the circuit 52 and initiating a reaction by the indicator 60. Examples of an indicator reaction may be an audible and/or a visual alert presented to the user of the vehicle 20. It is contemplated and understood that the indicator 60 and/or other components of the circuit 52 may be part of, or may communicate with, an Electronic Control Unit (ECU) of the vehicle 20. It is further contemplated and understood that the electrical pathway of the first leg 62 may be facilitated through steel bearings (not shown) adapted to reduce rotational friction of the worm shaft 48.

Figure 3:
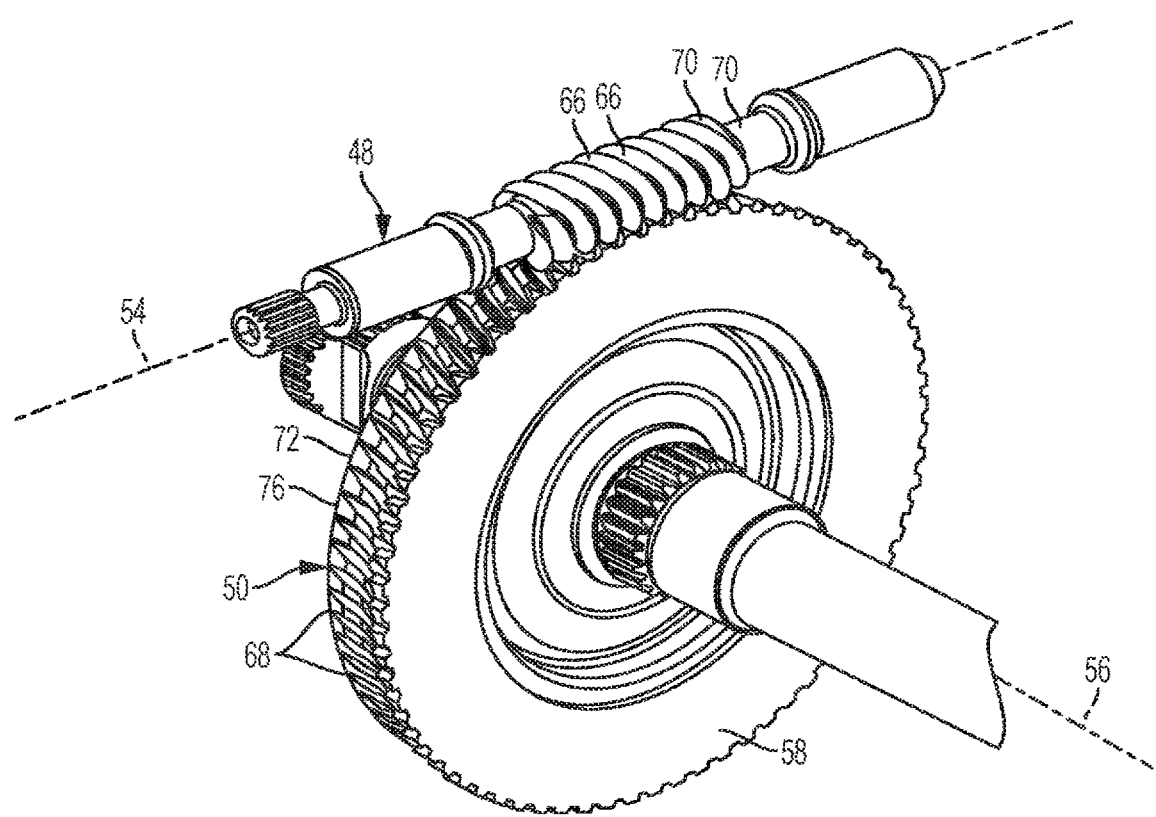
FIG. 3 is a perspective view of the gear assembly.
Figure 4:
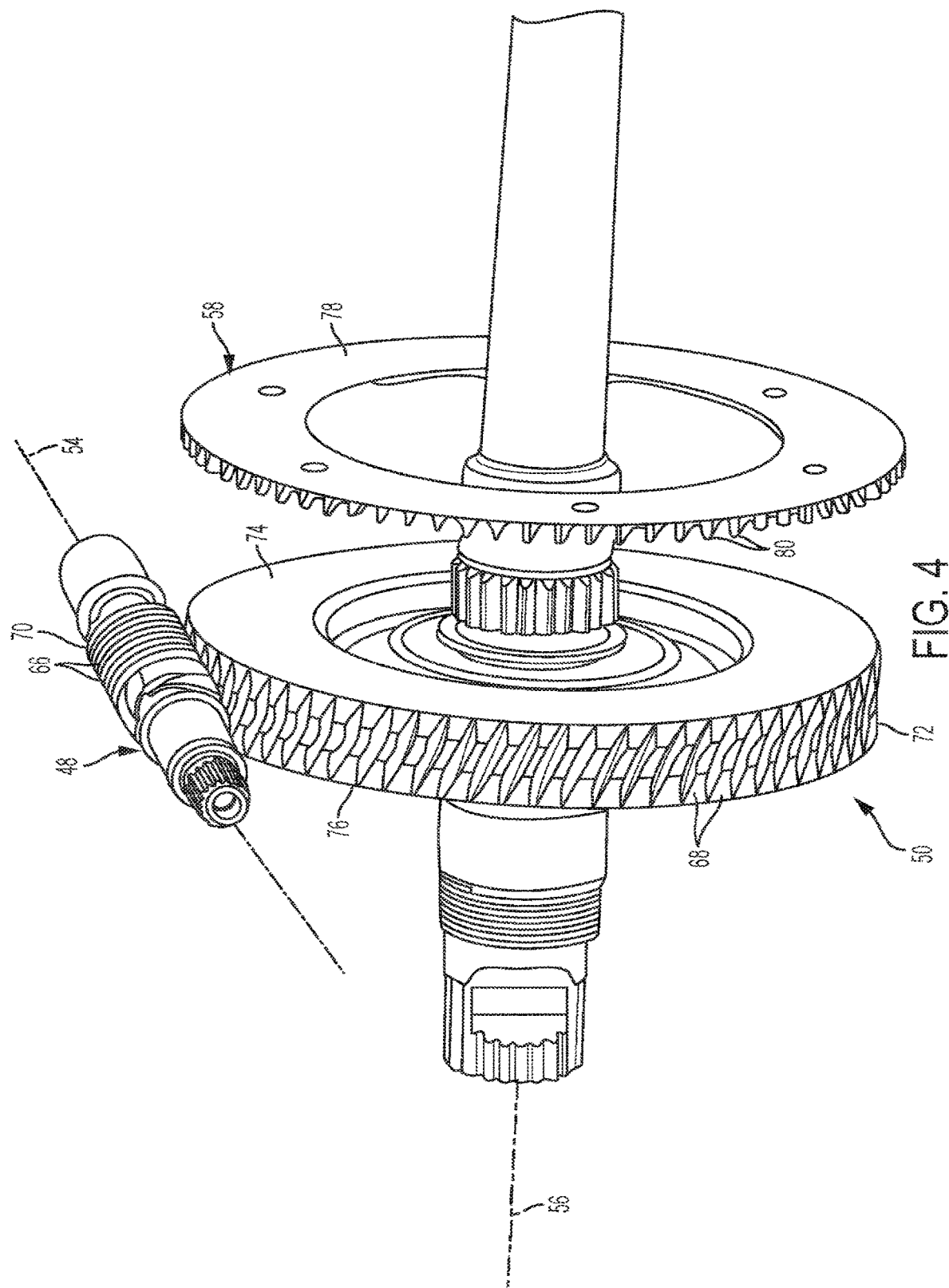
FIG. 4 is an exploded perspective view of the gear assembly.
Figure 5:
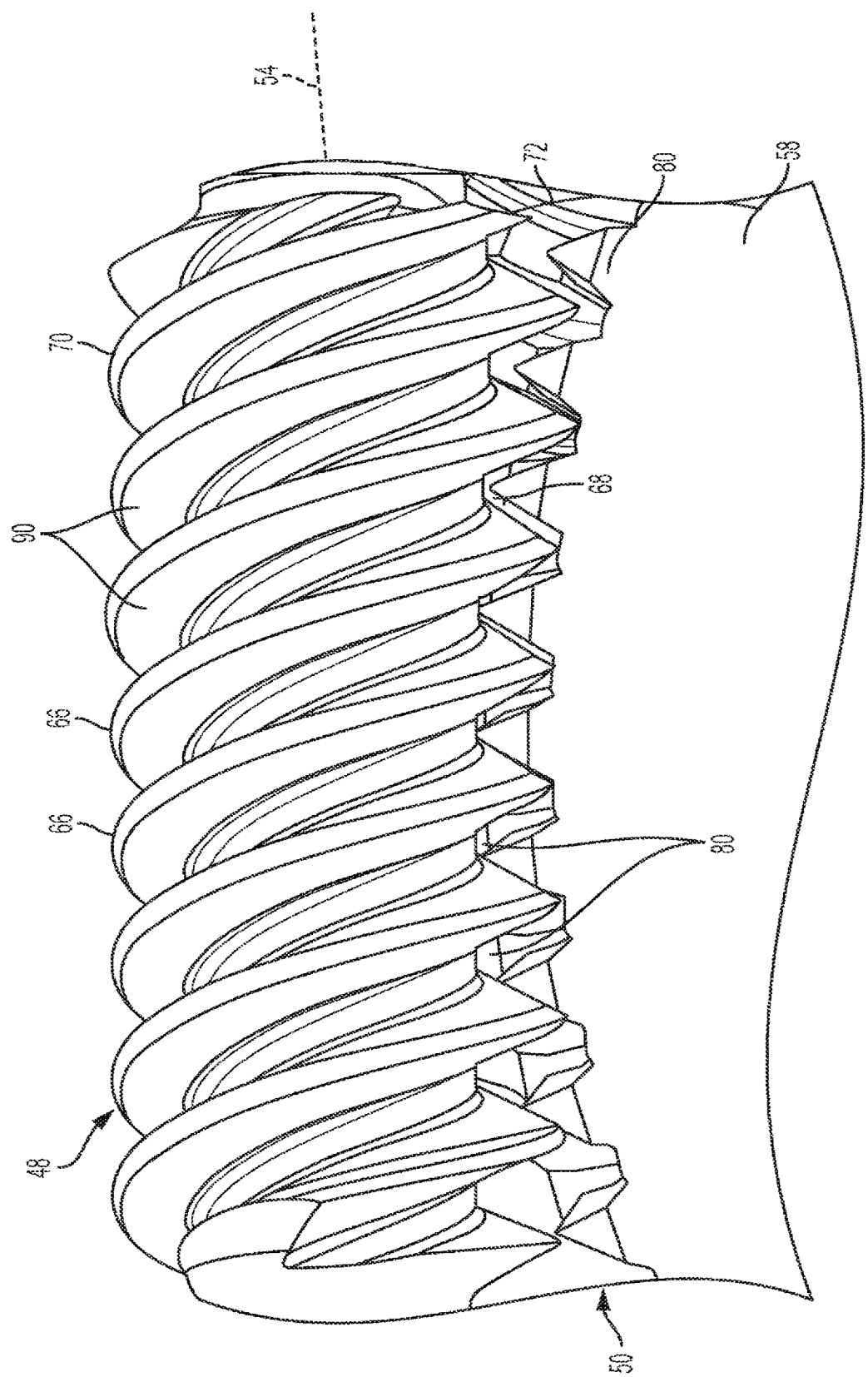
FIG. 5 is an enlarged perspective view of the gear assembly taken from circle 5 in FIG. 3.

Referring to FIGS. 3-5, the worm shaft 48 includes a plurality of teeth 66 (e.g., one helical rib) that generally project radially outward. The worm shaft 48, and any co-extending shaft associated with the worm shaft 48, may be made of a one-piece homogeneous material that is electrically conductive. The gear 50 includes a plurality of teeth 68 that project radially outward to operably mesh with the plurality of teeth 66 of the worm shaft 48. The gear 50 may be substantially made of an electrically non-conductive material that may be softer and/or more prone to wear than the plurality of teeth 66 of the worm shaft 48. In one example, the gear 50 may be made of plastic. In another example, a radially outward portion of the gear 50 that includes the teeth 68 may be made of the electrically non-conductive material while other portions may be made of a harder material such as steel.

The worm shaft 48 and the gear 50 may each include respective, circumferentially continuous, outer, surfaces 70, 72 carried by the respective teeth 66, 68. The surface 70 of the worm shaft 48 may be electrically conductive, and the surface 72 of the gear 50 may be electrically non-conductive and more prone to wear than the surface 70. The gear 50 may further include sides 74, 76 that face in opposite axial directions with respect to axis 54. The surface 72 may span axially between and may contiguously form into the opposite sides 74, 76.

Figure 6:
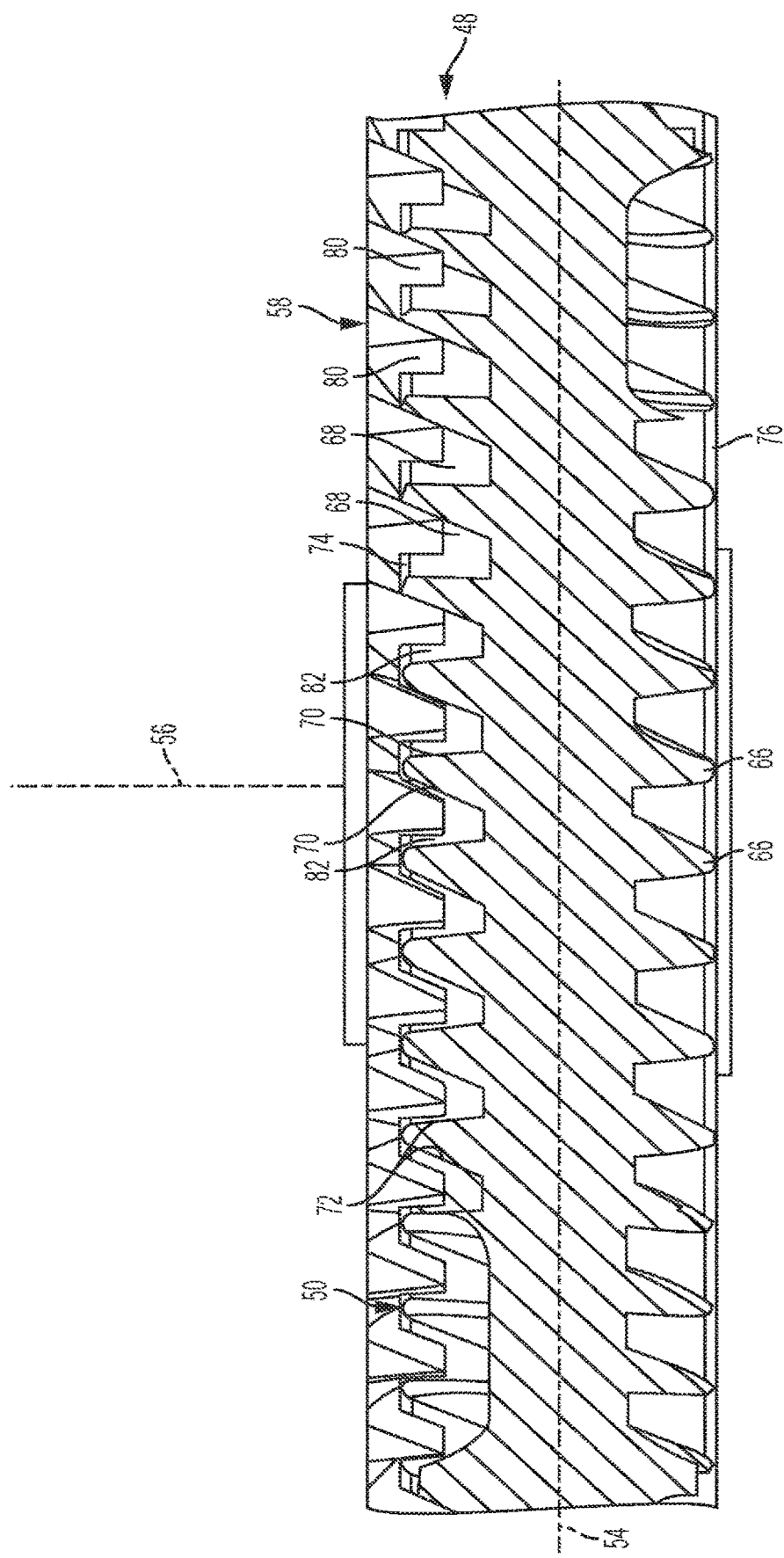
FIG. 6 is a longitudinal cross section of a worm shaft of the gear assembly.

Referring to FIGS. 4 through 6, the electrically conductive element 58 of the circuit 52 may include a portion 78 and a plurality of feelers 80. The portion 78 may be substantially planar, annular in shape, and may extend circumferentially continuously with respect to the axis 56. In one embodiment, the portion 78 may be disposed normal to axis 56, disposed radially inward from the plurality of teeth 68 of gear 50, and may be attached to, adhered to, or embedded in, the first side 74 of the gear 50. Each feeler of the plurality of feelers 80 may project radially outward from the portion 78, may be circumferentially aligned with a respective one of the plurality of teeth 68 of the gear 50, and may be spaced inward from the outer surface 72 of the gear 50. This spacing between the outer surface 72 of the gear 50 and each feeler 80 of the element 58 forms a layer 82 made of the electrically non-conductive gear material (e.g., plastic) that prevents closure of circuit 52.

In one embodiment, each feeler 80 may be wedge shaped and may also extend in an axial direction with respect to axis 56 and into each respective tooth 68 of the gear 50. As the gear 50 wears, the regions of the layer 82 disposed between each feeler 80 and the teeth 66 of the worm shaft 48 becomes thinner until one or more of the feelers 80 make electrical contact with the teeth 66 of the worm shaft 48. When this contact is made, the circuit 52 closes and the indicator 58 is initiated. The portion 78 of the conductive element 58 rotates with the gear 50 and may be part of, or may be in continuous electrical contact with, the leg 64 via brushes (not shown), through an electrically conductive shaft that co-extends with axis 54, or any other means known to one having skill in the art. It is contemplated and understood that the element 58 may be a part of the gear 50 as oppose to the circuit 52 and/or may be completely embedded within the gear 50.

Referring to FIG. 5 and in another embodiment, each adjacent pair of teeth of the plurality of teeth 66 of the worm shaft or gear 48 defines a respective valley or gap 90. As best shown in FIG. 4, the electrically conductive element 58 may be generally planar and is engaged to the gear 50 for rotation. Each feeler 80 may project radially outward from the base portion 78 and into a respective one of the plurality of valleys 90, see FIG. 5. When the gear 50 is not worn, the feelers 80 are spaced away from the teeth 66 of the worm shaft 48. When the gear 50 is worn, the feelers 80 may make electrical contact with a bearing side of the adjacent tooth 66.

Figure 7:
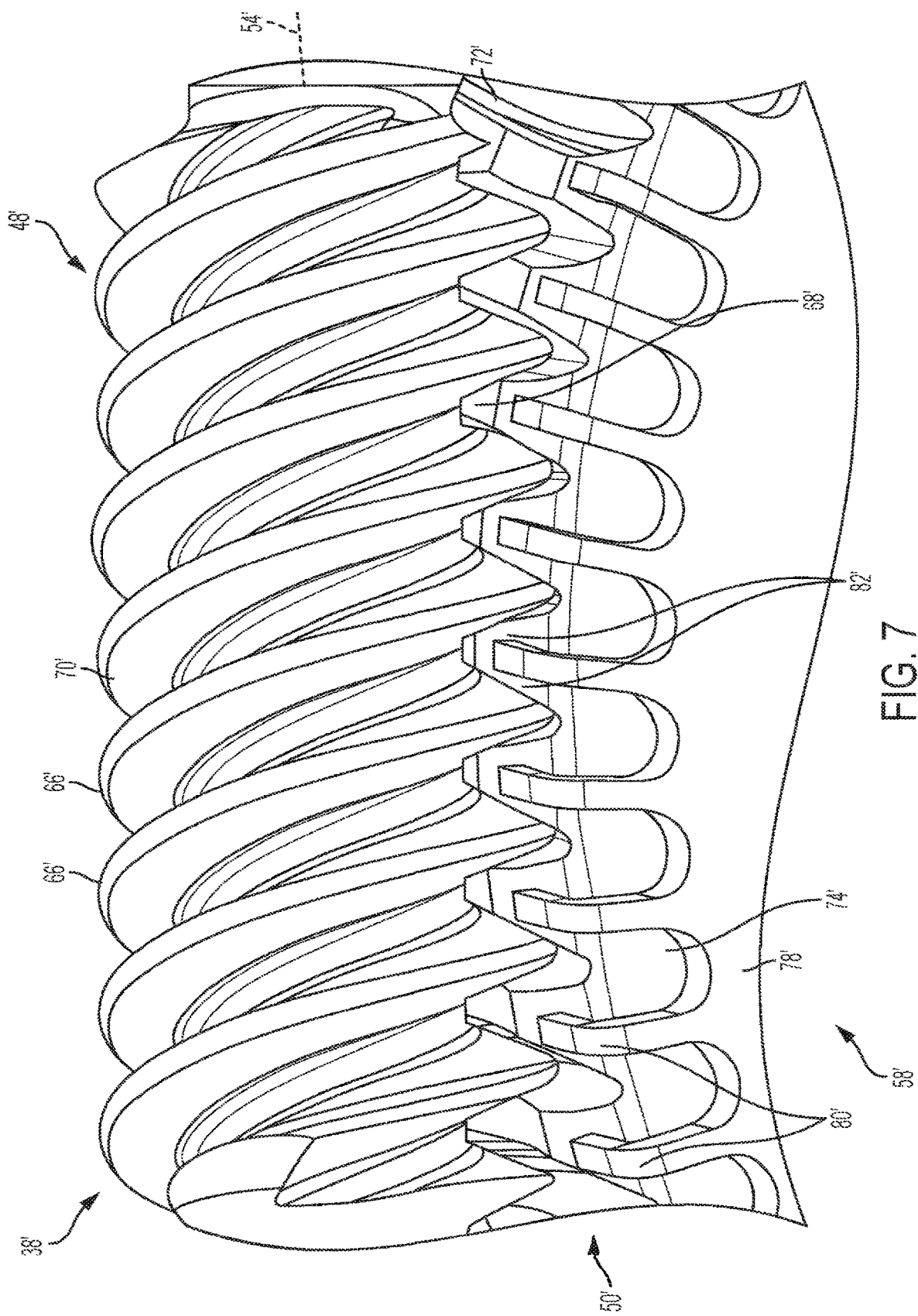
FIG. 7 is a perspective view of a second embodiment of a gear assembly similar in perspective to FIG. 5.

Referring to FIG. 7, a second embodiment of the gear assembly is illustrated wherein like elements to the first embodiment have like identifying numerals except with the addition of a prime symbol suffix. A gear assembly 38' includes an electrically conductive element 58' having a plurality of feelers 80' that are substantially planar. Each feeler 80' may lay within a respective imaginary plane that contains, and co-extends with, a rotational axis (not shown) of a gear 50'.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A gear assembly comprising:

a first gear adapted to rotate about a first axis, and including a first plurality of teeth and a first surface extending circumferentially and carried by the first plurality of teeth, wherein the first surface is electrically conductive;

a second gear adapted to rotate about a second axis and operably connected to the first gear, the second gear including an electrically conductive element, a second plurality of teeth, and a second surface extending circumferentially and carried by the second plurality of teeth, wherein the second surface is electrically nonconductive, and the electrically conductive element includes at least one feeler with each feeler projecting radially outward and into a respective tooth of the second plurality of teeth; and a circuit electrically connected to the first gear and the electrically conductive element, and configured to detect wear of the second plurality of teeth when the first gear is in electrical contact with the electrically conductive element.

2. The gear assembly set forth in claim 1, wherein the first gear is made of a metallic material and the second surface is carried by a layer made of an electrically nonconductive material that is softer than the metallic material.

3. The gear assembly set forth in claim 2, wherein the electrically nonconductive material is plastic.

4. The gear assembly set forth in claim 1, wherein the first axis is disposed normal to the second axis.

5. The gear assembly set forth in claim 4, wherein the first gear is a worm shaft.

6. The gear assembly set forth in claim 1, wherein the electrically conductive element includes a circumferentially continuous planar portion disposed normal to the second axis, and wherein the at least one feeler projects outward from the planar portion.

7. The gear assembly set forth in claim 6, wherein the second gear includes an axial segment made of the nonconductive material, spanning axially between opposite first and second sides, and carrying the second surface, and wherein the electrically conductive element is attached to the first side.

8. The gear assembly set forth in claim 7, wherein the electrically conductive element is adhered to the first side.

9. The gear assembly set forth in claim 7, wherein the electrically conductive element is embedded in the first side and exposed axially outward.

\* \* \* \* \*